US010951399B2

(12) United States Patent
Si et al.

(10) Patent No.: US 10,951,399 B2
(45) Date of Patent: Mar. 16, 2021

(54) BINARY STREAM HASH MODULUS ENCRYPTION AND DECRYPTION METHOD

(71) Applicants: ZHUHAI COLLEGE OF JILIN UNIVERSITY, Zhuhai (CN); JILIN UNIVERSITY, Changchun (CN)

(72) Inventors: Yujuan Si, Zhuhai (CN); Liuqi Lang, Zhuhai (CN)

(*) Notice: Subject to any disclaimer, the term of this patent is extended or adjusted under 35 U.S.C. 154(b) by 14 days.

(21) Appl. No.: 16/545,272

(22) Filed: Aug. 20, 2019

(65) Prior Publication Data

US 2019/0379532 A1 Dec. 12, 2019

Related U.S. Application Data

(63) Continuation of application No. PCT/CN2018/093658, filed on Jun. 29, 2018.

(51) Int. Cl.
*H04L 9/06* (2006.01)
*H04L 9/14* (2006.01)

(52) U.S. Cl.
CPC .......... *H04L 9/0643* (2013.01); *H04L 9/0618* (2013.01); *H04L 9/14* (2013.01)

(58) Field of Classification Search
None
See application file for complete search history.

(56) References Cited

U.S. PATENT DOCUMENTS

| 8,345,876 | B1 | 1/2013 | Sinn et al. |
| 2010/0241869 | A1* | 9/2010 | Iyer ..................... H04N 1/32309 713/189 |
| 2011/0231565 | A1 | 9/2011 | Gelter et al. |
| 2012/0183139 | A1 | 7/2012 | Matsuo |
| 2019/0238313 | A1* | 8/2019 | Austin .................. H04L 9/0861 |

FOREIGN PATENT DOCUMENTS

| CN | 102123026 A | 7/2011 |
| CN | 103095449 A | 5/2013 |
| CN | 103595524 A | 2/2014 |

* cited by examiner

*Primary Examiner* — Brandon S Hoffman
(74) *Attorney, Agent, or Firm* — Erson IP (Nelson IP)

(57) ABSTRACT

The present invention discloses a binary stream hash modulus encryption and decryption method, including: creating a clear-text set M according to a clear-text file; taking the clear-text set M as an initial set and performing several times of byte order iterative encryption on a reference string to obtain a cipher-text set C; wherein a key set P and an algorithm set A are combined during the iterative encryption; and calling the key set P for the cipher-text set C to perform several times of byte decryption on the reference string, wherein the key set P and the algorithm set A are jointly used during the encryption and shared during the encryption and decryption. By using the present invention, the file cannot be decoded even if intercepted by another person, an existing Internet platform is still used in a transmission environment, but transmitted information is encrypted information.

18 Claims, 3 Drawing Sheets

BINARY STREAM HASH MODULUS ENCRYPTION AND DECRYPTION METHOD

CROSS-REFERENCE TO RELATED APPLICATIONS

This application is a continuation of International Patent Application No. PCT/CN2018/093658 with a filing date of Jun. 29, 2018, designating the United States, now pending, and further claims priority to Chinese Patent Application No. 201810451010.5 with a filing date of May 11, 2018. The content of the aforementioned applications, including any intervening amendments thereto, are incorporated herein by reference.

TECHNICAL FIELD

The present invention relates to a binary stream hash modulus encryption and decryption method, and belongs to the field of computer information security.

BACKGROUND OF THE PRESENT INVENTION

Network communication information encryption, digital aerospace remote control command and data encryption, digital unmanned aerial vehicle remote communication data encryption, digital airborne early warning aircraft communication and command system information encryption, GPS digital satellite communication data encryption, mobile phone communication encryption, electronic mail encryption, electronic financial data transmission encryption, etc. can encrypt images of various formats in an aspect of image coding to protect intellectual property of the images. Military, political, diplomatic files after encrypted may be transmitted by utilizing a civil communication network, thereby saving file transmission cost.

Research. and development efforts for own information security are increased by each country after Mr Snowden's revelations. The reason that America can acquire information content of other countries is mainly manifested in aspects as follows:

Firstly, America has technical advantages of communication technologies and super user management rights of Internet;

Secondly, mail servers (American relevant departments compel mail server providers to provide mail information), information passing through routers (American relevant departments compel communication service departments and communication equipment providers to provide an information interception function), mobile phone communication information and the like may be intercepted by other people;

Thirdly, much information transmitted in Internet is unencrypted plain code information, which brings convenience for other people to acquire; the information (e.g. a love .letter mail leakage case of American commander-in-chief in Afghanistan);

Fourthly, America inputs huge material, human and financial resources and organizes a great team of network information collection, processing, analysis, screening and processing for collecting information of the countries (e.g. a mobile communication information eavesdropping event of Angela Merket, the chancellor of Germany).

Stream cipher is also called a sequential cipher. In the current research state of the stream cipher, since analysis and design of the stream cipher are often applied to military and diplomatic communications of a country; research and development and design of the stream cipher are basically performed in a privacy status, and scholars and experts who research and develop the stream cipher in each country have fewer public books in this respect for the purpose of privacy. Stream cipher techniques and products are used as military products by each country and are limited in export. Due to incomparable advantages to many other ciphers, the stream cipher is one of the most common cipher systems nowadays.

The current research direction of stream cryptography is based on a mathematical model. Complicated algebraic operation, Boolean calculation, pseudo-random numbers, shifting registers, linear feedback and the like are used for completing encryption and decryption of the stream cipher. Relatively successful methods in this respect include an A5 method, an S-box method, an RC4 method, a K2 method and the like. These methods are secrets that are not open. By virtue of many years of research, a certain mature approach is formed for the encryption and decryption. At present, many scholars have researched to attack and decode cipher texts encrypted by the above methods, which brings a great challenge to security of the cipher texts encrypted by the above methods.

A systemic method is mainly adopted by a current designing solution of the stream cipher. A pseudorandom sequence is generated by utilizing a linear feedback shift register so as to generate a key stream sequence. Methods for generating pseudorandom sequences include: a feedback shift register sequence, feedforward sequences generated by a linear shift register and a nonlinear feedforward function, a clock controlled sequence, a combined network sequence, a feedback-with-carry-shift-register, cellular automaton, a chaos theory and the like.

SUMMARY OF PRESENT INVENTION

The present invention provides a binary stream hash modules encryption and decryption method. The method is as follows:

A technical solution of the present invention comprises the binary stream hash modulus encryption and decryption method. The method comprises: creating a clear-text set M according to a clear-text file, wherein the clear-text file may be any parsable file; taking the clear-text set M as an initial set and performing several times of byte order iterative encryption on a reference string to obtain a cipher-text set C, wherein a key set P and an algorithm set A are combined during the iterative encryption, and the iterative encryption comprises acquiring arbitrary values of the clear-text set M, the cipher-text set C and the key set P as initial values and pointers corresponding to the initial values and performing iterative encryption on the clear-text set M to obtain the cipher-text set C by virtue of the pointers and an encryption algorithm of the algorithm set A; and calling the key set P for the cipher-text set C to perform several times of byte decryption on the reference string, wherein the key set P and the algorithm set A are jointly used during the encryption; the key set P and the algorithm set A are shared during the encryption and decryption; the decryption comprises retrieving the initial values during the iterative encryption, creating bit pointers corresponding to the initial values to combine the C reference string and the encryption algorithm of the algorithm set A to perform several times of byte decryption of the reference string for the cipher-text Set C so as to obtain the clear-text set M, and converting the clear-text set M into a clear-text file, wherein the number of bytes of the reference string is $2^m$, $m \geq 1$ and is a positive integer; and the clear-text set M, the cipher-text set C and the key set P take bits of the sets as circular linked lists.

In a preferred embodiment; the clear-text set M, the cipher-text set C, the key set P and the algorithm set A are character sets composed of binary codes.

According to the binary stream hash modulus encryption and decryption method, creating the clear-text set according to the clear-text file comprises: reading the clear-text file to obtain the number n of bytes of the clear-text file; and creating a clear-text, set M serving as an ordered set, wherein $M=\{X_0X_1X_{n-1}\}=\{x_0x_1\ x_{8n-1}\}$, $x_i=\{0,1\}$, $X_i$ is a clear-text byte, $x_i$ is a clear-text bit, the $X_i$ correspondingly comprises i ($0 \leq i \leq n-1$) in a byte set, the, $x_i$ correspondingly comprises i ($0 \leq i \leq 8n-1$) in a bit set, and the bits in the M serve as a circular linked list, so that a succeeding bit of the $x_{8n-1}$ is $x_0$.

According to the binary stream hash modulus encryption and decryption method, the method further comprises: the key set P is $P=\{Y_0Y_1Y_{n-1}\}=\{y_0y_1\ y_{8n-1}\}$, $y_j=\{0,1\}$, $Y_j$ is a clear-text byte, $y_j$ is a clear-text bit, the $Y_j$ correspondingly comprises j ($0 \leq j \leq n-1$) in a byte set, the $y_j$ correspondingly comprises j ($0 \leq j \leq 8n-1$) in a bit set, and the bits in the P serve as a circular linked list, so that a succeeding bit of the $y_{8n-1}$ is $y_0$.

According to the binary stream hash modulus encryption and decryption method, the method further comprises: the cipher-text set C is $C=\{Z_0Z_1Z_{n-1}\}=\{z_0z_1\ z_{8n-1}\}$, $Z_k=\{0,1\}$, $Z_k$ is a clear-text byte, $z_k$ is a clear-text bit, the $Z_k$ correspondingly comprises k ($0 \leq k \leq n-1$) in a byte set, the $z_k$ correspondingly comprises k ($0 \leq k \leq 8n-1$) in a bit set, and the bits in the C serve as a circular linked list, so that a succeeding bit of the $z_{8n-1}$ is $z_0$.

According to the binary stream hash modulus encryption and decryption method, the method further comprises: establishing bit head as 0, and establishing a bit tail as 8n−1; acquiring any initial value i ($0 \leq i \leq 8n-1$) to act on the initial values of the set M, and retaining the value; acquiring any initial value j ($0 \leq j \leq 8n-1$) to act -on the initial values of the set P, and retaining the value; acquiring any initial value k ($0 \leq k \leq 8n-1$) to act on the initial values of the set C, and retaining the value; and creating a variable s as a location counter of the bits.

According to the binary stream hash modulus encryption and decryption, method, the method further comprises a first encryption method which executes iterative encryption twice when the number of bytes of the reference string is 2, comprising: establishing a pointer p to point to a bit $x_i$ of the set M, and locating a value p to the bit head when the value p is located at the bit tail; establishing a pointer q to point to a bit $y_j$ of the set P, and locating a value q to the bit head when the value q is located at the bit tail; establishing a pointer r to point to a bit $z_k$ of the set C, and locating a value r to the bit head when the value r is located at the bit tail; executing first traversing encryption, wherein when the value p points to the bit $x_i$ of the set M, the value q points to the bit $y_j$ of the set P, and the value r points to the bit $z_k$ of the set C, s=0; if !*q&&!(s % 2) is judged to be true, *r=*p; the values p, q, r and s are progressively increased; and if !*q&&!(s % 2) is judged to be not true, the values p and q are progressively increased; executing second traversing encryption, wherein when the value p points to the bit $x_i$ of the set M, the value q points to the bit $y_j$ of the set P, s=0; if !*q&&!(s % 2) is judged to be true, *r=*p, and the values p, q, r and s are progressively increased, and if !*q&&!(s % 2) is judged to be not true, the values p and q are progressively increased; executing third traversing encryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values p and q are progressively increased; and executing fourth traversing encryption, wherein when the value p points to the bit, $x_i$ of the set M, the value q points to the bit $y_j$ of the set P, s=0; if *q&&(s % 2) is judged to be true, *r=*p, and the values p, q, r and s are progressively increased, and if *q&&(s % 2) is judged to be not true, the values p and q are progressively increased.

According to the binary stream hash modulus encryption and decryption method, the method further comprises a second encryption method which executes iterative encryption twice when the number of bytes of the reference string is 2, comprising: establishing a pointer p to point to a bit $x_i$ of the set M, and locating a value p to the bit head when the value p is located at the bit tail; establishing a pointer q to point to a bit $y_j$ of the set P, and locating a value q to the bit head when the value q is located at the bit tail; establishing a pointer r to point to a bit $z_k$ of the set C, and locating a value r to the bit head when the value r is located at the bit tail; executing first traversing encryption, wherein when the value p points to the bit of the set M; the value q points to the bit $y_j$ of the set P, and the value r points to the bit $z_k$ of the set C, s=0; if !*q&&!(s % 2) is judged to be true, *r=*p, and the values p, q, r and s are progressively increased, and if !*q&&!(s % 2) is judged to be not true, the values r and q are progressively increased executing second traversing encryption, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values r and q are progressively increased; executing third traversing encryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values r and q are progressively increased; and executing fourth traversing encryption, wherein when the value p points to the bit $x_i$ of the set M, the value q points to the bit $y_j$ of the set P, s=0; if *q&&(s % 2) is judged to be true, *r=*p, and the values p, q, r and s are progressively increased; and if *q&&(s % 2) is judged to be not true, the values r and q are progressively increased.

According to the binary stream hash modulus encryption and decryption method, the method further comprises a first decryption method corresponding to the first encryption method. The first decryption method comprises: retrieving the encrypted initial values i, j and k; establishing a pointer p to point to a bit $x_i$ of the set M, and locating a value p to the bit head when the value p is located at the bit tail; establishing a pointer q to point to a bit $y_j$ of the set P, and locating a value q to the bit head when the value q is located at the bit tail; establishing a pointer r to point to a bit $z_k$ of the set C, and locating a value r to the bit head when the value r is located at the bit tail; executing a traversing decryption, step corresponding to the fourth encryption step, wherein when the value p points to the bit $x_i$ of the set M, the value q points to the bit $y_j$ of the set P, s=0; if !*q&&!(s % 2) is judged to be true, *r=*p, and the values p, q, r and s are progressively increased; and if !*q&&!(s % 2) is judged to be not true, the values p and q are progressively increased; executing a traversing decryption step corresponding to the third encryption step, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values p and q are progressively increased; executing a traversing decryption step corresponding to the second encryption step, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values p and q are progressively increased; and executing a traversing decryption step corresponding to the first encryption step, wherein when the value p points to the bit $x_i$ of the set M, the value q points to the bit $y_j$ of the set P; and the value r points to the bit $z_k$ of the set C, s=0; if *q&&(s % 2) is judged to be true, *r=*p, and the values p, q, r and s are progressively increased, and if *q&&(s % 2) is judged to be not true, the values p and q are progressively increased.

According to the binary stream hash modulus encryption and decryption method, the method further comprises a second decryption method corresponding to the second encryption method. The second decryption method comprises: retrieving the encrypted initial values i, j and k; establishing a pointer p to point to a bit $x_i$ of the set M, and locating a value p to the bit head When the value p is located at the bit tail; establishing a pointer q to point to a bit $y_j$ of the set P, and locating a value q to the bit head when the value q is located at the bit tail; establishing a pointer r to point to a bit $z_k$ of the set C, and locating a value r to the bit head when the value r is located at the bit tail; executing a decryption step corresponding to the fourth encryption step, wherein when the value p points to the bit $x_i$ of the set M, the value q points to the bit $y_j$ of the set P, s=0; if !*q&&!(s % 2) is judged to be true, *r=*p, and the values p, q, r and s are progressively increased, and if !*q&&!(s % 2) is judged to be not true, the values p and q are progressively increased; executing a decryption step corresponding to the third encryption step, wherein when the value p points to the bit $x_i$ of the set M, the value q points to the bit $y_j$ of the set P, s=0; if !*q&& (s % 2) is judged to be true, *r=*p, and the valises p, q, r and s are progressively increased, and if !*q&&(s % 2) is judged to be not true, the values p and q are progressively increased; executing a decryption step corresponding to the second encryption step, Wherein when the value p points to the bit $x_i$ of the set M, the value q points to the bit $y_j$ of the set P, s=0; if *q&&!(s% 2) is judged to be true, *r=*p, and the values p, q, r and s are progressively increased, and if *q&&!(s % 2) is judged to be not true, the values p and q are progressively increased; and executing a decryption. step Corresponding to the first encryption step, wherein when the value p points to the bit $x_i$ of the set M, the value q points to the bit $y_j$ of the set P, and the value r points to the bit $z_k$ of the set C, *q&&(s % 2) is judged to be true, and the values p, q, r and s are progressively increased, and if *q&&(s % 2) is judged to be not true, the values p and q are progressively increased.

According to the binary stream hash modulus encryption and decryption. method, the algorithm set A comprises at least one pair of algorithms for encryption and corresponding decryption algorithms, and the number of elements in the algorithm set A is recorded as sum(A), wherein sum(A) mod2=0.

According to the binary stream hash modulus encryption and decryption method, key files corresponding to the key set P comprise but not limited to audios, videos, pictures, images, graphs, pseudorandom codes and chaos values.

The present invention has beneficial effects as follows: an implementation mode is simple, and human and material resources are saved; the decryption is complicated; and decryption difficulty may be effectively improved or the decryption is: difficult to perform; a file transmitted in the existing Internet can become secure; and the file cannot be decoded even if intercepted by another person; and the existing Internet platform is still used by the transmission technology or environment, but the transmitted information is encrypted information.

DESCRIPTION OF THE DRAWINGS

FIG. 2 is a detailed diagram of a first encryption and decryption method according to the present invention;
and
FIG. 3 is a detailed diagram of a second encryption and decryption method according to the present invention.

DETAILED DESCRIPTION OF PREFERRED EMBODIMENTS

Figure 1:
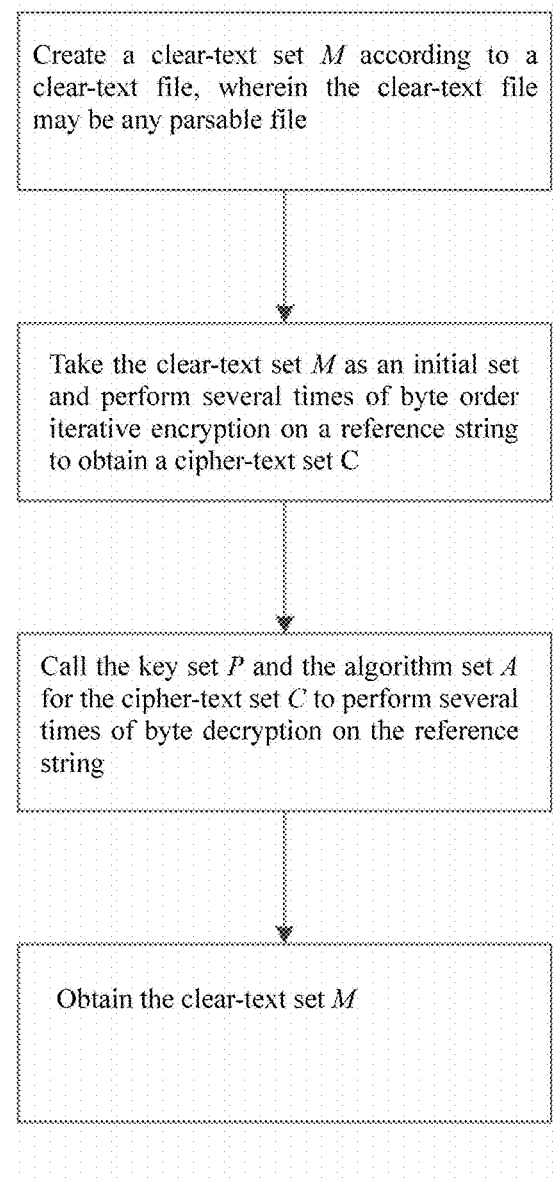
FIG. 1 is an overview flow chart of a method according to the present invention.

The concept, the specific structure and achieved technical effects of the present invention will be clearly and completely described in combination with embodiments and drawings below.

It should be noted that, unless otherwise specified, when a certain feature is called as "fixed" or "connected" to another feature, the feather may be directly fixed or connected to, the another feature, or may be indirectly fixed or connected to the another feature. In addition, descriptions used in the present invention, such as upper, lower, left, right and the like, are used relative to mutual positional relations of various components of the present invention in the drawings only. Singular forms used in the present invention, such as "one", "said" and "the", are intended to include plural forms, unless clearly representing other Meanings in context. In addition, unless otherwise defined, all technical and scientific terms used in the present invention are the same as meanings generally understood by those skilled in the art. The terms used in description of the present invention are, only used for illustrating specific embodiments, not for limiting the present invention, The term "and/or" used in the present invention comprises any Combination of one or more related items listed.

It should be understood that, although the various elements may be described by terms such as first, second, third and the like in the present invention, these elements shall not be limited to these terms. These terms are only used for distinguishing elements of the same type. For example, the first element may also be called as a second element on premise of not deviating from the scope of the present invention. Similarly, the second element may also be called as a first element. Use of any and all of instance or exemplary language ("for example?", "such as" and the like) provided in the present invention is only intended to better describe embodiments of the present invention. Moreover, unless otherwise required, the scope of the present invention is not limited.

By referring to FIG. 1, the following technical features are specifically disclosed: a clear-text set M is created according to a clear-text file, wherein the clear-text file may be any passable file; the clear-text set M is taken as an initial set and several times of byte order iterative encryption are performed on a reference string to obtain a cipher-text set C, wherein a key set P and an algorithm set A are combined during the iterative encryption, and the iterative encryption comprises acquiring any values of the clear-text set M, the cipher-text set C and the key set P as initial values, and pointers corresponding to the initial values and performing iterative encryption on the clear-text set M to obtain the cipher-text set C by virtue of the pointers and an encryption algorithm of the algorithm set A. The key set P is called for the cipher text set C to perform several times of byte decryption for the reference string, wherein the key set P and the algorithm, set A are jointly used during the encryption; and the key set P and the algorithm set A are shared during the encryption and decryption. The decryption comprises: retrieving the initial values during the iterative encryption, creating bit pointers corresponding to the initial values to combine the C reference string and the encryption algorithm of the algorithm set A to perform several times of byte decryption of the reference string for the Cipher-text set C so as to obtain the clear-text set M, and converting the clear-text set M into a clear-text file, wherein the number of bytes of the reference string is $2^m$, m≥1 and is a positive integer; and the clear-text set M, the cipher-text set C and the key set P take bits of the sets as circular linked lists.

The following technical features are further disclosed in the technical solution of the present invention:

(1) Characteristics of Encryption and Decryption Sets

Encryption system tetrad (M, C, P, A), and the sets M, C, P and A have the following characteristics:

Information {0,1} in the set is a set of byte characters composed of binary code elements, and is applicable to ASCII codes.

The clear-text set M comprises n bytes, the number of the code elements is recorded as sum(M)=8n, and sum(M) mod8=0.

The number of elements of the cipher-text set C is $c_1$, $c_{21}$, ..., $c_j$c1, c2, c3, ..., cr obtained by taking the set M as an initial value and performing r times of iteration. The number of the code elements in a subset $c_j$ (j=1,2,3 ..., r) is recorded as sum($c_j$), and sum($c_j$)mod8=0. Assuming that the number of bytes of the $c_j$ is in, then:

when m<n, compression encryption is performed;

when m=n, one-to-one encryption, or equidensity encryption is performed; and when m>n, redundant encryption is performed.

The number of the code elements; of the key set P is recorded as sum(P), and sum(P)mod8=0. Assuming that the number of bytes in the set P is m, m≤n. The number of the bytes in the set P is preliminarily defined as 1, and the key set P is shared by encryption and decryption. The set does not comprise codes 0×00 and 0×ff.

Algorithms in the algorithm set A have feasibility, definiteness and finiteness and also have the only input and the only output.

The algorithm set A is a computer executable code set and is also called as a set of functions. The number of elements in the set A is recorded as sum(A), and sum(A)mod2=0.

Characteristics of the algorithm set are as follows: if an algorithm α exists, $c_i$ is encrypted into $c_j$, an algorithm b inevitably exists, and the $c_j$ is reduced into the $c_i$, namely an inversion algorithm or a reduction algorithm exists.

(2) Encryption Principle

Setting clear-text set M={$X_0X_1 \ldots X_{n-1}$}={$x_0x_1 \ldots x_{8n-1}$}, and $x_i$={0,1}. $X_i$ is a clear-text byte, $x_i$ is a clear-text bit, i (0≤i≤n−1) exists in a byte set, and i (0≤i≤8n−1) exists in a bit set;

Setting a key set P={$Y_0Y_1 \ldots Y_{n-1}$}={$y_0y_1 \ldots y_{8n-1}$}, and $y_j$={0,1}. $Y_j$ is a clear-text byte, $y_j$ is a clear-text bit, j (0≤j≤n−1) exists in a byte set, and j (0≤k≤8n−1) exists in a bit set;

Setting a cipher-text set C={$Z_0Z_1 \ldots Z_{n-1}$}={$z_0z_1 \ldots z_{8n-1}$}, and $z_k$={0,1}. $Z_k$ is a clear-text byte, $z_k$ is a clear-text bit, k (0≤k≤n−1) exists in a byte set, and k (0≤k≤8n−1) exists in a bit set;

If the bits in the set M are regarded as a circular finked list, a succeeding bit of the $x_{8n-1}$ is $x_0$;

If the bits in the set P are regarded as a circular linked list, a succeeding bit of the $y_{8n-1}$ is $y_0$ in the set P;

If the bits in the set C are regarded as a circular linked list, a succeeding bit of the $z_{8n-1}$ is $z_0$ in the set C;

Establishing a bit head=0; and establishing a bit tail=8n−1;

Acquiring any initial value i (0≤i≤8n−1) to act on the initial values of the set M, and retaining the value;

Acquiring any initial value j (0≤j≤8n−1) to act on the initial values of the set P, and retaining the value;

Acquiring any initial value k (0≤k≤8n−1) to act on the initial values of the set C, and retaining the value;

Taking a variable s as a bit location counter.

The encryption method comprises two specific encryption methods.

Figure 2:
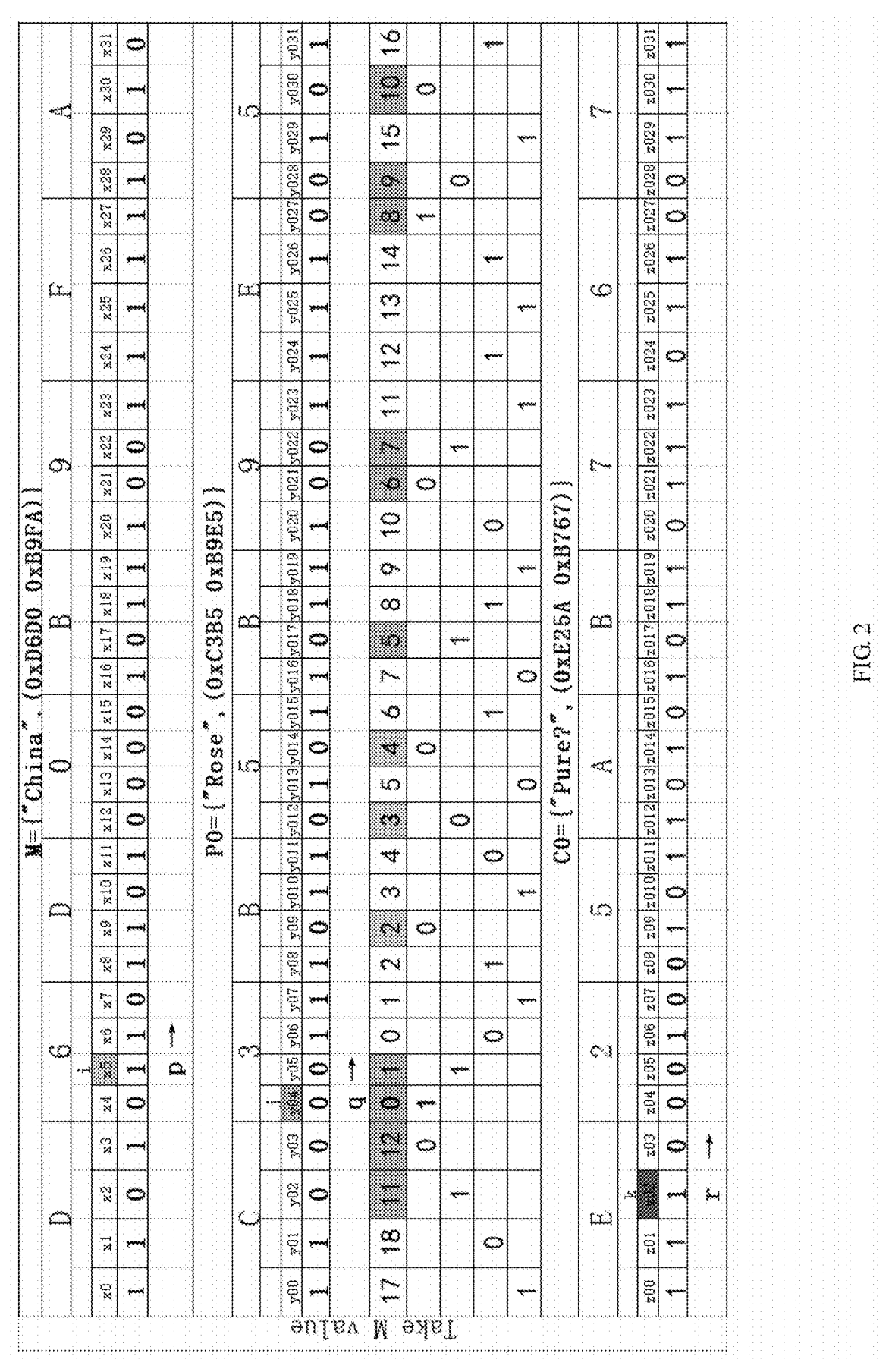

FIG. 2 is a detailed diagram of a first encryption and decryption method. according to the present invention. By referring to FIG. 1 and FIG. 2, the first encryption and decryption method specifically comprises:

(1) Encryption establishing a pointer p to point to a bit $x_i$ of the set M, and locating p→head When p→tail;

establishing a pointer q to point to a bit $y_j$ of the set P, and locating q→head when q→tail;

establishing a pointer r to point to a bit $z_k$ of the set C, and locating r→head when r→tail;

at the first time, p→bit $x_i$, q→bit $y_j$, r→bit $z_k$, s=0; if !*q&&!(s % 2) is judged to be true, *r=*p, r++; p++; q++; s++, otherwise, p++; q++;

at the second time, p→bit $x_i$, q→bit $y_j$, s=0; if !*q&&(s % 2) is judged to be true, *r=*p, r++; p++; q++, s++, otherwise, p++; q++;

at the third time; p→bit $x_i$; q43bit $y_j$, s=0; if *q&&!(s % 2) is judged to be true, *r=*p, r++; p++; q++s++, otherwise, p++; q++; and at the fourth time, p→bit $x_i$, q→bit $y_j$, s=0; if *q&&(s % 2) is judged to be true, *r=*p, r++; p++; q++; s++, otherwise, p++; q++.

(2) Decryption retrieving the encrypted initial values i, j and k;

establishing a pointer p to point to a bit $x_i$ of the set M, and locating p→head when p→*tail;

establishing a pointer q to point to a bit $x_i$ of the set P, and locating q→head when q→tail;

establishing a pointer r to point to a bit $z_k$ of the set C, and locating r→head when r→tail;

at the fourth time, p→bit $x_i$, q→bit $y_j$, s=0; if *q&&(s % 2) is judged to be true, *p=*r, r++; p++; q++; s++, otherwise, p++; q++;

at the third time, p→bit $x_i$, q→bit $y_j$, s=0; if *q&&!(s % 2) is judged to be true, *p=*r, r++; p++; q++; s++, otherwise, p++; q++;

at the second time, p→bit $x_i$, q→bit $y_j$, s=0; if !*q&&(s % 2) is judged to be true, *p=*r, r++; p++; q++; s++, otherwise, p++; q++; and at the first time, p→bit $x_i$, q→bit $y_j$, $z_k$; s=0; if !*q&&!(s % 2) is judged to be true, *p=*r; r++; p++; q++; s++, otherwise, p++; q++.

Specific encryption and decryption:

X is "0" location counter, and Y is "1" location counter

MOD(X,2)==0

MOD(X,2)==1

MOD(Y,2)==0

MOD(Y,2)==1

1. M={"China"} represents a clear-text, that is, a to-be-encrypted text. {0xD6D0 0xB9FA} is an internal code of two Chinese characters "Zhongguo", which is an encrypted input sequence;

2. P={"Rose"} represents a key. {0xC3B5 0xB9E5} is an internal code of two Chinese characters "Meigui".

4. The initial values are selected as i=5, j=4, and k=2.

5. The encryption method 1 is used, and a cipher text C={0XE25A,0XB767} is obtained by encryption.

Decryption process 1. the initial values i=5, j=4, and k=2 are retrieved;

2. the cipher text is represented by C={0XE25A, 0XB767}; and 5. the encrypted cipher text C0={0x6E5B 0Xf934} is reduced into the clear-text M={"China"}={0xD6D0 0xB9FA} by using P={"Rose"}={0xC3B5 0xB9E5}.

Figure 3:
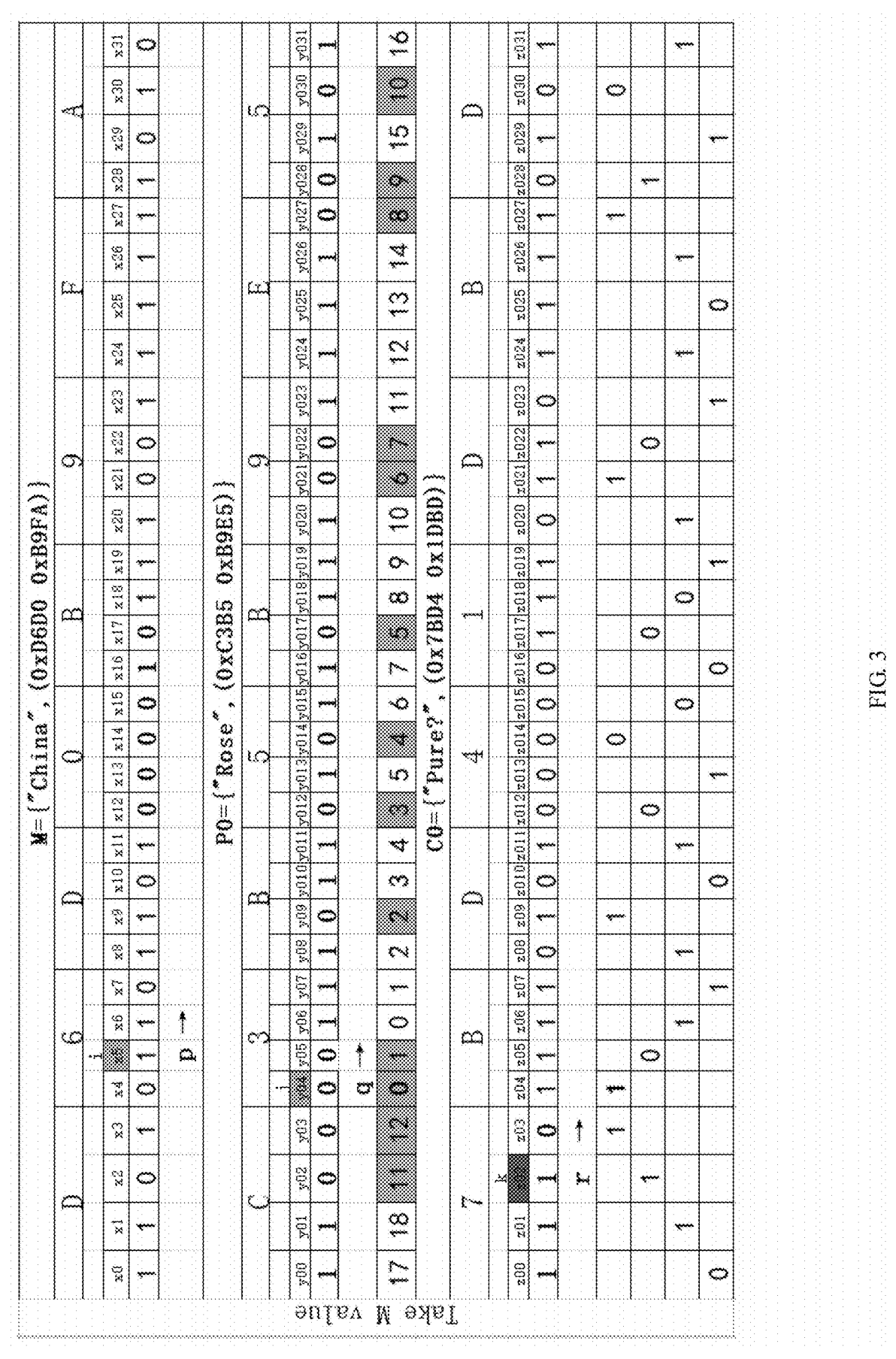

FIG. 3 shows a detailed diagram of a second encryption and decryption method according to the present invention. By referring to FIG. 1 and FIG. 3, the second encryption and decryption method specifically comprises:

encryption establishing a pointer p to point to a bit $x_i$ of the set M, and locating p→head when p→tail;

establishing a pointer q to point to a bit $y_j$ of the set P, and locating q→head when q→tail;

establishing a pointer r to point to a bit $z_k$ of the set C, and locating r→head when r→tail;

at the first time; p→bit $x_i$, q→bit $y_j$, r→bit $z_k$, s=0; if !*q&&!(s % 2) is judged to be true, *r=*p, r++; p++; q++, otherwise, r++; q++;

at the second time, p→bit $x_i$, q→bit $y_j$, s=0; if !*q&&(s % 2) is judged to be true, *r=*p, r++; p++; q++, otherwise, r++; q++;

at the third time, p→bit $x_i$, q→bit $y_j$, s=0; if *q&&!(s % 2) is judged to be true, *r=*p, r++; p++; q++, otherwise, r++; q++; and at the fourth time, p→bit $x_i$, q→bit $y_j$, s=0; if *q&&(s % 2) is judged to be true, *r=*p, r++; p++; q++, other wise, r++; q++.

Decryption establishing a pointer p to point to a bit $x_i$ of the set M, and locating p→head when p→tail;

establishing a pointer q to point to a bit $y_j$ of the set P, and locating q→head when q→tail;

establishing a pointer r to point to a bit $z_k$ of the set C, and locating r→head when r→tail;

at the fourth time, p→bit $x_i$, q→bit $y_j$, s=0; if *q&&(s % 2) is judged to be true, *p=*r, r++; p++; q++; s++, otherwise, r++; q++;

at the third time, p→bit $x_i$, q→bit $y_j$, s=0; if *q&&!(s % 2) is judged to be true, *p=*r, r++; p++; q++; s++; otherwise, r++; q++;

at the second time, p→bit $x_i$, q→bit $y_j$, s=0; if !*q&&(s % 2) is judged to be true, *p=*r, r++; p++; q++; s++, otherwise, p++; q++; arid at the first time, p→bit $x_i$, q→bit $y_j$, r→bit $z_k$, s=0; if !*q&&!(s % 2) is judged to be true, *p=*r, r++; p++; q++; s++, otherwise, r++; q++.

By referring to FIG. 2 and FIG. 3, the technical solution of the present invention further discloses a program-implementable encryption algorithm which is specifically as follows:

1. setting a clear-text file M={"China"}={0xD6 0xD0 0xB9 0xFA}=(1101 0110, 1101 0000 1011 1000 1111 1010)$_2$; and setting, a key file P={"Rose"}={0xC3 0xB5 0xB9 0xE5}=(1100 0011 1011 0101 1011 1000 1110 0101)$_2$;

2. establishing a character pointer char*p_str_M;
establishing a character pointer char*p_str_P; and
establishing a character pointer char*p_str_C;

3. opening the clear-text file M, counting the number of bytes of the clear-text file M, and storing the number of bytes into n;

4. distributing a clear-text storage space p_str_M=(char*) malloc(n*sizeof(char));

distributing a key storage space p_str_P=(char*)malloc (n*sizeof(char)); and distributing a key storage space p_str_C=(Char*)malloc (n*sizeof(char));

5. reading the clear-text file M into the referred space p_str_M, wherein p_str_M points to a starting address of the space;

reading the key file P into the referred space p_str_P, wherein p_str_P points to the starting address of the space; and p_str_C points to a starting address of the encrypted cipher-text space;

6. taking the initial value i of the bits=5, that is, starting from the bit $x_5$ of the referred space p_str_M, and retaining the value, as shown in FIG. 1;

taking the initial value j of the bits=4, that is, starting from the bit $y_4$ of the referred space p_str_P, and retaining the value, as shown in FIG. 1; and taking the initial value k of the bits=2, that is, starting from the bit $z_2$ of the referred space p_str_C, and retaining the value, as shown in FIG. 1;

7. building a function int string_read_bit(char*p, int i) which returns the value (0,1) of the bit i in a character string p;

8. building a function void string_write_bit(char*p, int i, int j) which writes the bit i in the character string p into the value (0,1) of j;

9. taking the encryption method 1 as an example

```
                // first traversing
p=i;q=j;r=k;s=0;
for(t=0;t<8*n;i++)
        {x = string_read_bit(p_str_P, q);
         if(!x&&!(s%2))
        {y = string_read_bit(p_str_M, p);
string_write_bit(p_str_C, r, y);
                    p++;if(p>8*n-1) p=0;
q++;if(q>8*n-1) q=0;
                    r++;if(r>8*n-1) r=0;
s++;}
                else
                    {q++;if(p>8*n-1) p=0;
p++;if(q>8*n-1) q=0;}
}
                // second traversing
p=i;q=j;s=0;
for(t=0;t<8*n;i++)
        {x = string_read_bit(p_str_P, q);
         if(!x&&(s%2))
        {y = string_read_bit(p_str_M, p);
string_write_bit(p_str_C, r, y);
                    p++;if(p>8*n-1) p=0;
q++;if(q>8*n-1) q=0;
                    r++;if(r>8*n-1) r=0;
s++}
                else
                    {p++;if(p>8*n-1) p=0;
q++;if(q>8*n-1) q=0;}
}
                // third traversing
p=i;q=j;s=0;
for(t=0;t<8*n;i++)
        {x = string_read_bit(p_str_P, q)
         if(x&&!(s%2))
        {y = string_read_bit(p_str_M, p);
string_write_bit(p_str_C, r, y);
                    p++;if(p>8*n-1) p=0;
```

```
            q++;if(q>8*n-1) q=0;
                        r++;if(r>8*n-1) r=0;
s++;}
                else
                    {p++;if(p>8*n-1) p=0;
q++;if(q>8*n-1) q=0;}
}
                // fourth traversing
        p=i;q=j;s=0;
        for(t=0;t<8*n;i++)
                {x = string_read_bit(p_str_P, q);
                    if(x&&(s%2))
                {y = string_read_bit(p_str_M, p);
                string_write_bit(p_str_C, r, y);
                            p++;if(p>8*n-1) p=0;
        q++;if(q>8*n-1) q=0;
                        r++;if(r>8*n-1) r=0;
s++;}
                else
                    {p++;if(p>8*n-1) p=0;
q++;if(q>8*n-1) q=0;}
}
```

The p_str_C is the cipher text after four times of traversing.
Decryption process
Taking the encryption method 1 as an example
// the first traversing during decryption corresponds to the fourth traversing during encryption

```
        p=i;q=j;s=0;r=k;
        for(t=0;t<8*n;i++)
                {x = string_read_bit(p_str_P, q);
                    if(x&&(s%2))
                {y = string_read_bit(p_str_C, p);
                string_write_bit(p_str_M, r, y);
                            p++;if(p>8*n-1) p=0;
        q++;if(q>8*n-1) q=0;
                        r++;if(r>8*n-1) r=0;
s++;}
                else
                    {
p++;if(p>8*n-1) p=0;
q++;if(q>8*n-1) q=0;}
}
```

The second traversing during decryption corresponds to the third traversing during encryption

```
        p=i;q=j;s=0;
        for(t=0;t<8*n;i++)
                {x = string_read_bit(p_str_P, q);
                    if(x&&!(s%2))
                {y = string_read_bit(p_str_C, p);
                string_write_bit(p_str_M, r, y);
                            p++;if(p>8*n-1) p=0;
        q++;if(q>8*n-1) q=0;
                        r++;if(r>8*n-1) r=0;
s++;}
                else
                    {p++;if(p>8*n-1) p=0;
q++;if(q>8*n-1) q=0;}
}
```

The third traversing during decryption corresponds to the second traversing during encryption

```
        p=i;q=j;s=0;
        for(t=0;t<8*n;i++)
                {x = string_read_bit(p_str_P, q);
                    if(!x&&(s%2))
                {y = string_read_bit(p_str_C, p);
                string_write_bit(p_str_M, r, y);
                            p++;if(p>8*n-1) p=0;
        q++;if(q>8*n-1) q=0;
                        r++;if(r>8*n-1) r=0;
s++;}
                else
                    {p++;if(p>8*n-1) p=0;
q++;if(q>8*n-1) q=0;}
}
```

The fourth traversing during decryption corresponds to the first traversing during encryption

```
        p=i;q=j;s=0;
        for(t=0;t<8*n;i++)
                {x = string_read_bit(p_str_P, q);
        if (!x&&!(s%2))
                {y = string_read_bit(p_str_C, p);
                string_write_bit(p_str_M, r, y);
                            p++;if(p>8*n-1) p=0;
        q++;if(q>8*n-1) q=0;
                        r++;if(r>8*n-1) r=0;
s++;}
                else
                    {p++;if(p>8*n-1) p=0;
q++;if(q>8*n-1) q=0;}
}
```

The p_str_M is the clear text after four times of traversing.
Application function source program

```
    int read_string_bit(char *p_str, int n)
    {char ch0;
    int i, byte, bit;
            byte=n/8;bit=n%8;
            for(i=0;i<byte;i++)
p_str++;
            ch0=*p_str;
            ch0=ch0<<bit;ch0=ch0&(0x80);
            if(ch0)
    return 1;
            else
    return 0;
    }
    void write_string_bit(char *p_str, int n, int boolean)
    {char ch0;
        int i, byte, bit;
            byte=n/8;bit=n%8;
            for(i=0;i<byte;i++)
```

-continued

```
        p_str++;
              ch0=*p_str;
              switch(bit)
        {     case 0: {ch0=ch0&0x7f;if(boolean)ch0=ch0|0x80;break;}
              case 1: {ch0=ch0&0xbf;if(boolean)ch0=ch0|0x40;break;}
              case 2: {ch0=ch0&0xdf;if(boolean)ch0=ch0|0x20;break;}
              case 3: {ch0=ch0&0xef;if(boolean)ch0=ch0|0x10;break;}
              case 4: {ch0=ch0&0xf7;if(boolean)ch0=ch0|0x08;break;}
        case 5: {ch0=ch0&0xfb;if(boolean)ch0=ch0|0x04;break;}
        case 6: {cb0=ch0&0xfd;if(boolean)ch0=ch0|0x02;break;}
        case 7: {cb0=ch0&0xfe;if(boolean)ch0=ch0|0x01;break;}
    }
    *p_str=ch0;
}
```

Compared with the prior art, the patented technology realizes a stream cipher encryption process without special computer hardware and special electronic logic devices and even without design of a logic circuit. A feedback problem and a feedback algorithm of a chaotic signal are not involved, and the encryption and decryption processes of the stream ciphers are completely solved by computer software programming. In this way, external condition requirements of encryption and decryption of plain codes are extremely low. The encryption and decryption may be performed as long as there is a networked computer. This technology has excellent applicability.

In the encryption technology, if the content of a protocol file (key) is longer, the decryption difficulty is higher. The specification in the prior art uses 32 bytes which may also be lengthened to 64 bytes and 128 bytes, or even longer.

Software products developed by this technology may be applied to information transmission of diplomatic service, may also be applied to information transmission of military branch, and have excellent effects on remote image transmission and, encryption. Since decoding difficulty is high, it is almost impossible to decode the plain codes during secrecy.

Only one byte is taken as a reference string during the above encryption process. Such encryption is easily decoded. However, when the number of the bytes of the reference string is 8; 16, 32 or even 64, the decoding difficulty is much higher, while the length of the reference string may be the same as the length of the bytes of the clear text. Even for a single byte, if multiple iterations can be performed, the decoding difficulty is still quite high.

Due to the development of the modern communication technology, increase Of a certain amount of transmission codes is not a problem anymore.

It should be recognized that, embodiments of the present invention may be realized or implemented by computer hardware, a combination of hardware and software, or computer instructions stored in a non-temporary computer-readable memory. The method may be realized in a computer program by using a standard programming technique comprising a non-temporary computer-readable storage medium with computer programs, wherein due to the storage medium which is configured in this way, the computer is operated in specific and predefined manners, i.e., according to methods and drawings described in the specific embodiments. Each program may communicate with a computer system by virtue of an advanced process or object-oriented programming language. However, if necessary, the program may be realized by assembly or machine language. In any case, the language may be compiled or interpreted language. In addition, for this purpose, the program can run on a special programming integrated circuit.

In addition operations of the processes described in the present invention may be executed according to any appropriate sequence, unless otherwise indicated or obviously inconsistent with the context in other manners in the present invention. The processes (or variations and/or combinations thereof) described in the present invention may be executed under control of one or more computer systems provided with executable instructions; may serve as codes (such as, executable instructions, one or more computer programs or one or more applications) jointly executed on one or more processors and may be realized by hardware or combinations thereof. The computer programs comprise multiple instructions that may be executed by one or more processors.

Further, the method may be realized on any type of appropriate computing platforms which are operatively connected, including but not limited to a personal, computer, a minicomputer, a main frame, a workstation, a network or distributed computing environment, a single or integrated computer platform of communication With a charged particle tool or other imaging devices, and the like. Various aspects of the present invention may be realized by machine-readable codes that are stored on a non-temporary storage medium or device. A mobile or integrated computing platform, such as a hard disk, an optical reading and/or write-in storage medium, RAM, ROM and the like, may be read by a programmable computer. When read by the computer, the storage medium or device may be used for configuring and operating the computer to execute the processes described herein. In addition, the machine-readable codes may be partially transmitted by a wired or wireless network. When such media include instructions or programs that realize the steps above by combining with a microprocessor or other data processors, the present invention comprises these and other different types of non-temporary computer-readable Storage media. When programming is performed according to the method and the technology in the present invention, the present invention further comprises a computer itself.

The computer programs can be applied to inputting data to execute the functions described in the present invention, so that the input data is converted to generate output data stored in a nonvolatile memory. Output information can also be applied to one or more output devices such as displays. In preferred embodiments of the present invention, the converted data represents physical and tangible objects, including specific visual depiction of physical and tangible objects generated on the displays.

The above only describes the preferred embodiments of the present invention. The present invention is not limited to the above embodiments. As long as the technical effects of the present invention are achieved, in the same way, any modification, equivalent replacement, improvement and the like made within the spirit and the principle of the present invention shall be included in the protection scope of the present invention. The technical solutions and/or embodiments in the protection scope of the present invention may have various different modifications and changes.

What is claimed is:

1. A binary stream hash modulus encryption and decryption method, comprising:

creating a clear-text set M according to a clear-text file, wherein the clear-text file may be any parsable file;

taking the clear-text set M as an initial set and performing several times of byte order iterative encryption on a reference string to obtain a cipher-text set C, wherein a key set P and an algorithm set A are combined during the iterative encryption, and the iterative encryption comprises acquiring arbitrary values of the clear-text set M, the cipher-text set C and the key set P as initial values and pointers corresponding to the initial values and performing iterative encryption on the clear-text set M to obtain the cipher-text set C by virtue of the pointers and an encryption algorithm of the algorithm set A; and calling the key set P for the cipher-text set C to perform several times of byte decryption on the reference string, wherein the key set P and the algorithm set A are jointly used during the encryption, and the key set P and the algorithm set A are shared during the encryption and decryption;

the decryption comprises retrieving the initial values during the iterative encryption, creating bit pointers corresponding to the initial values to combine the C reference string and the encryption algorithm of the algorithm set A to perform several times of byte decryption of the reference string for the cipher-text set C so as to obtain the clear-text set M, and converting the clear-text set M into a clear-text file, wherein the number of bytes of the reference string is $2^m$, $m \geq 1$ and is a positive integer;

the clear-text set M, the cipher-text set C and the key set P take bits of the sets as circular linked lists;

wherein the creating the clear-text set M according to the clear-text file comprises:

reading the clear-text file to obtain the number n of bytes of the clear-text file; and creating a clear-text set M serving as an ordered set, wherein $M=\{X_0X_1\ldots X_{n-1}\}=\{x_0x_1\ldots x_{8n-1}\}$, $x_i=\{0,1\}$, $X_i$ is a clear-text byte, $x_i$ is a clear-text bit, the $X_i$, correspondingly comprises i ($0 \leq i \leq n-1$) in a byte set, the $x_i$ correspondingly comprises i ($0 \leq i \leq 8n-1$) in a bit set, and the bits in the M serve as a circular linked list, so that a succeeding bit of the $x_{8n-1}$ is $x_0$.

2. The binary stream hash modulus encryption and decryption method according to claim 1, wherein the clear-text set M, the cipher-text set C, the key set P and the algorithm set A are character sets composed of binary codes.

3. The binary stream hash modulus encryption and decryption method according to claim 1, wherein the method further comprises:

the key set P is $P=\{Y_0Y_1\ldots Y_{n-1}\}=\{y_0y_1\ldots y_{8n-1}\}$, $y_j=\{0,1\}$, $Y_j$ is a clear-text byte, $y_j$ is a clear-text bit, the $Y_j$ correspondingly comprises j ($0 \leq j \leq n-1$) in a byte set, the $y_j$ correspondingly comprises j ($0 \leq j \leq 8n-1$) in a bit set, and the bits in the P serve as a circular linked list, so that a succeeding bit of the $y_{8n-1}$ is $y_0$.

4. The binary stream hash modulus encryption and decryption method according to claim 1, wherein the method further comprises:

the cipher-text set C is $C=\{Z_0Z_1\ldots Z_{n-1}\}=\{z_0z_1\ldots z_{8n-1}\}$, $z_k=\{0,1\}$, $Z_k$ is a clear-text byte, $z_k$ is a clear-text bit, the $Z_k$ correspondingly comprises k ($0 \leq k \leq n-1$) in a byte set, the $z_k$ correspondingly comprises k ($0 \leq k \leq 8n-1$) in a bit set, and the bits in the C serve as a circular linked list, so that a succeeding bit of the $z_{8n-1}$ is $z_0$.

5. The binary stream hash modulus encryption and decryption method according to claim 1, wherein the method further comprises:

establishing a bit head as 0, and establishing a bit tail as $8n-1$;

acquiring any initial value i ($0 \leq i \leq 8n-1$) to act on the initial values of the set M, and retaining the value;

acquiring any initial value j ($0 \leq j \leq 8n-1$) to act on the initial values of the set P, and retaining the value;

acquiring any initial value k ($0 \leq k \leq 8n-1$) to act on the initial values of the set C, and retaining the value; and creating a variable s as a location counter of the bits.

6. The binary stream hash modulus encryption and decryption method according to claim 1, further comprising a first excryption method, wherein the method executes iterative encryption twice when the number of bytes of the reference string is 2, comprising:

establishing a pointer p to point to a bit $x_i$ of the set M, and locating a value p to the bit head when the value p is located at the bit tail;

establishing a pointer q to point to a bit $y_j$ of the set P, and locating a value q to the bit head when the value q is located at the bit tail;

establishing a pointer r to point to a bit $z_k$ of the set C, and locating a value r to the bit head when the value r is located at the bit tail;

executing first traversing encryption, wherein when the value p points to the bit $x_i$ of the set M, the value q points to the bit $y_j$ of the set P, and the value r points to the bit $z_k$ of the set C, s=0; if !*q&&!(s % 2) is judged to be true, *r=*p; the values p, q, r and s are progressively increased; and if !*q&&!(s % 2) is judged to be not true, the values p and q are progressively increased;

executing second traversing encryption, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values p and q are progressively increased;

executing third traversing excryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&(s % 2) is judged to be not true, the values p and q are progressively increased.

7. The binary stream hash modulus encryption and decryption method according to claim 1, further comprising a second encryption method, wherein the method executes iterative encryption twice when the number of bytes of the reference string is 2, comprising:

establishing a pointer p to point to a bit $x_i$ of the set M, and locating a value p to the bit head when the value p is located at the bit trail;

establishing a pointer q to point to a bit $y_j$ of the set P, and locating a value q to the bit head when the value q is located at the bit tail;

establishing a pointer r to point to a bit $z_k$ of the set C, and locating a value r to the bit head when the value r is located at the bit tail;

executing first traversing encryption, wherein when the value p points to the bit $x_i$ of the set M, the value q points to the bit $y_j$ of the set P, and the value r points to the bit $z_k$ of the set C, s=0; if !*q&&!(s % 2) is judged to be true, *r=*p, and the values p, q, r and s are progressively increased, and if !*q&&!(s % 2) is judged to be not true, the values r and q progressively increased;

executing second traversing encryption, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values r and q are progressively increased;

executing third traversing encryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if !*q&&!(s % 2) is judged to be not true, the values r and q are progressively increased; and executing fourth traversing encryption, wherein when the value p points to the bit $x_i$ of the set M, the value q points to the bit $y_j$ of the set P, s=0; if *q&&(s % 2) is judged to be true, *r=*p, and the values p, q, r and s are progressively increased; and if *q&&(s % 2) is judged to be not true, the values r and q are progressively increased.

8. The binary stream hash modulus encryption and decryption method according to claim 6, further comprising a first decryption method corresponding to the first encryption method, wherein the first decryption method comprises:

retrieving the encrypted initial values i, j and k;

establishing a pointer p to point to a bit $x_i$ of the set M, and locating a value p to the bit head when the value p is located at the bit tail;

establishing a pointer q to point to a bit $y_j$ of the set P, and locating a value q to the bit head when the value q is located at the bit tail;

establishing a pointer r to point to a bit $z_k$ of the set C, and locating a value r to the bit head when the value r is located at the bit tail;

executing a traversing decryption step corresponding to the fourth encryption step, wherein when the value p points to the bit $x_i$ of the set M, the value q points to the bit $y_j$ of the set P, s=0; if !*q&&!(s % 2) is judged to be true, *r=*p, and the values p, q, r and s are progressively increased; and if !*q&&!(s % 2) is judged to be not true, the values p and q are progressively increased;

executing a traversing decryption step corresponding to the third encryption step, wherein when the value p points to the bit $x_i$ of the set M, the value q points to the bit $y_j$ of the set P, s=0; if !*q&&(s % 2) is judged to be true, *r=*p, and values p, q, r and s are progressively increased, and if !*q&&(s % 2) is judged to be not true, the values p and q are progressively increased;

executing a traversing decryption step corresponding to the second encryption step, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values p and q are progressively increased; and executing a traversing decryption step corresponding to the first encryption step, wherein when the value p points to the bit $x_i$ of the set M, the value q points to the bit $y_j$ of the set P, and the value r points to the bit $x_k$ of the set C, s=0; if *q&&(s % 2) is judged to be true, *r=*p, and the values p, q, r and s are progressively increased, and if *q&&(s % 2) is judged to be not true, the values p and q are progressively increased.

9. The binary stream hash modulus encryption and decryption method according to claim 7, further comprising a first decryption method corresponding to the first encryption method, wherein the first decryption method comprises:

retrieving the encrypted initial values i, j and k;

establishing a pointer p to point to a bit $x_i$ of the set M, and locating a value p to the bit head when the value p is located at the bit tail;

establishing a pointer q to point to a bit $y_j$ of the set P, and locating a value q to the bit head when the value q is located at the bit tail;

establishing a pointer r to point to a bit $z_k$ of the set C, and locating a value r to the bit head when the value r is located at the bit tail;

executing a traversing decryption step corresponding to the fourth encryption step, wherein when the value p points to the bit $x_i$ of the set M, the value q points to the bit $y_j$ of the set P, s=0; if !*q&&!(s % 2) is judged to be true, *r=*p, and the values p, q, r and s are progressively increased; and if !*q&&!(s % 2) is judged to be not true, the values p and q are progressively increased;

executing a traversing decryption step corresponding to the third encryption step, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values p and q are progressively increased;

executing a traversing decryption step corresponding to the second encryption step, wherein when the value p points to the bit $x_i$ of the set M, the value q points to the bit $y_j$ of the set P, s=0; if *q&& !(s % 2) is judged to be true, *r=*p, and the values p, q, r and s are progressively increased, and if *q&& !(s % 2) is judged to be not true, the values p and q are progressively increased; and executing a traversing decryption step corresponding to the first encryption step, wherein when the value p points to the bit $x_i$ of the set M, the value q points to the bit $y_j$ of the set P, and the value r points to the bit $z_k$ of the set C, s=0; if *q&&(s % 2) is judged to be true, *r=*p, and the values p, q, r and s are progressively increased, and if *q&&(s % 2) is judged to be not true, the values p and q are progressively increased.

10. The binary stream hash modulus encryption and decryption method according to claim 1, wherein the algorithm set A comprises at least one pair of algorithms for encryption and corresponding decryption algorithms, and the number of elements in the algorithm set A is recorded as sum(A), wherein sum(A)mod2=0.

11. The binary stream hash modulus encryption and decryption method according to claim 1, wherein key files corresponding to the key set P comprise but not limited to audios, videos, pictures, images, graphs, pseudo-random codes and chaos values.

12. A binary stream hash modulus encryption and decryption device, comprising:
  a first processing unit, configured to create a clear-text set M according to a clear-text file, wherein the clear-text file is any parsable file;
  a second processing unit, configured to take the clear-text set M as an initial set and perform several times of byte order iterative encryption on a reference string to obtain a cipher-text set C, wherein a key set P and an algorithm set A are combined during the iterative encryption,
  the iterative encryption comprises acquiring arbitrary values of the clear-text set M, the cipher-text set C and the key set P as initial values and pointers corresponding to the initial values and performing iterative encryption on the clear-text set M to obtain the cipher-text set C by virtue of the pointers and an encryption algorithm of the algorithm set A; and
  a third processing unit, configured to call the key set P for the cipher-text set C to perform several times of byte decrpytion on the reference string, wherein the key set P and the algorithm set A are jointly used during the encryption, and the key set P and the algorithm set A are shared during the encryption and decryption;
  the decrpytion comprises retrieving the initial values during the iterative encryption, creating bit pointers corresponding to the initial values to combine the C referenece string and the encryption algorithm of the algorithm set A to perform several times of byte decrpytion of the reference string for the cipher-text set C so as to obtain the clear-text set M, and converting the clear-text set M into a clear-text file,
  wherein the number of bytes of the reference string is $2^m$, $m \geq 1$ and is a positive integer;
  the clear-text set M, the cipher-text set C and the key set P take bits of the sets as circular linked lists;
  wherein the creating the clear-text set M according to the clear-text file comprises:
  the clear-text file is read to obtain the number n of bytes of the clear-text file; and
  a clear-text set M is created serving as an ordered set, wherein M={$X_0 X_1 \ldots X_{n-1}$}={$x_0 x_1 \ldots x_{8n-1}$}, $x_i$={0,1}, $X_i$ is a clear text-byte, $x_i$ is a clear text-bit, the $X_i$ correspondingly comprises i ($0 \leq i \leq n-1$) in a byte set, the $x_i$ correspondingly comprises i ($0 \geq i \geq 8n-1$) in a bit set, and the bits in the M serve as a circular linked list, so that a succeeding bit of the $x_{8n-1}$ is $x_0$.

13. The binary stream hash modulus encryption and decryption device according to claim 12, wherein the clear-text set M, the cipher-text set C, the key set P and the algorithm set A are character sets composed of binary codes.

14. The binary stream hash modulus encryption and decryption device according to claim 12, wherein the device further comprises:
  the key set P is P={$Y_0 Y_1 \ldots Y_{n-1}$}={$y_0 y_1 \ldots y_{8n-1}$}, $Y_j$ is a clear-text byte, $y_j$ is a clear-text bit, the $Y_j$ correspondingly comprises j ($0 \geq j \geq n-1$) in a byte set, the $y_j$ correspondingly comprises j ($0 \geq j \geq 8n-1$) in a bit set, and the bits in the P serve as a circular linked list, so that a succeeding bit of the $y_{8n-1}$ is $y_0$.

15. The binary stream hash modulus encryption and decryption device according to claim 12, wherein the device further comprises:
  the cipher-text set C is C={$Z_0 Z_1 \ldots Z_{n-1}$}={$z_0 z_1 \ldots z_{8n-1}$}, $z_k$={0,1}, $Z_k$ is a clear-text byte, $z_k$ is a clear-text bit, the $Z_k$ correspondingly comprises k ($0 \geq k \geq n-1$) in a byte set, the $z_k$ correspondingly comprises k ($0 \geq k \geq 8n-1$) in a bit set, and the bits in the C serve as a circular linked list, so that a succeeding bit of the $z_{8n-1}$ is $z_0$.

16. The binary stream hash modulus encryption and decrpytion device according to claim 12, wherein the device further comprises a fourth processing unit,
  configured to establish a bit head as 0 and establish a bit tail as 8n−1;
  configured to acquire any initial value i ($0 \geq i \geq 8n-1$) to act on the initial values of the set M, and retain the value;
  configured to acquire any initial value j ($0 \geq j \geq 8n-1$) to act on the initial values of the set P, and retain the value;
  configured to acquire any initial value k ($0 \geq k \geq 8n-1$) to act on the initial values of the set C, and retain the value; and
  configured to create a variable s as a location counter of the bits.

17. The binary stream hash modulus encryption and decryption device according to claim 12, wherein the device further comprises a first encryption unit configured to execute iterative encryption twice when the number of bytes of the reference string is 2, comprising:
  wherein the first encryption unit is configured to
  establish a pointer p to point to a bit $x_i$ of the set M, and locate a value p to the bit head when the value p is located at the bit tail;
  establish a pointer q to point to a bit $y_j$ of the set P, and locate a value q to the bit head when the value q is located at the bit tail;
  establish a pointer r to point to a bit $z_k$ of the set C, and locate a value r to the bit head when the value r is located at the bit tail;
  execute first traversing encryption, wherein when the value p points to the bit $x_i$ of the set M, the value q points to the bit $y_j$ of the set P, and the value r points to the bit $z_k$ of the set C, s=0; if !*q&&!(s % 2) is judged to be true, *r=*p; the values p, q, r and s are progressively increased; and if !*q&&!(s % 2) is judged to be not true, the values p and q are progressively increased;
  execute second traversing encryption, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values p and q are progressively increased;
  execute third traversing encryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values p and q are progressively increased; and
  execute fourth traversing encryption, wherein when the value p points to the bit $x_i$ of the set M, the value q points to the bit $y_j$ of the set P, s=0; if *q&&(s % 2) is judged to be true, *r=*p, and the values p, q, r and s are progressively increased, and if *q&&(s % 2) is judged to be not true, the values p and q are progressively increased.

18. The binary stream hash modulus encryption and decryption device according to claim 12, wherein the device further comprises a second encryption unit configured to execute iterative encryption twice when the number of bytes of the reference string is 2, comprising:
  wherein the second encryption unit is configured to
  establish a pointer p to point to a bit $x_i$ of the set M, and locate a value p to the bit head when the value p is located at the bit tail;

establish a pointer q to point to a bit $y_j$ of the set P, and locate a value q to the bit head when the value q is located at the bit tail;

establish a pointer r to a point to a bit $z_k$ of the set C, and locate a value r to the bit head when the value r is located at the bit tail;

execute first traversing encryption, wherein when the value p points to the bit $x_i$ of the set M, the value q points to the bit $y_j$ of the set P, and the value r points to the bit $z_k$ of the set C, s=0; if !*q&&(s % 2) is judged to be true, *r=*p, and the values p, q, r and s are progressively increased, and if !*q&&!(s % 2) is judged to be not true, the values r and q are progressively increased;

execute second traversing encryption, wherein when the value p points to the bit $x_i$ of the set M, the value q points to the bit $y_j$ of the set P, s=0; if !*q&&(s % 2) is judged to be true, *r=*p, and the values p, q, r and s are progressively increased, and if !*q&&(s % 2) is judged to be not true, the values r and q are progressively increased;

execute third traversing encryption, wherein when the value p points to the bit $x_i$ of the set M, the value q points to the bit $y_j$ of the set P, s=0; if *q&&!(s % 2) is judged to be true, *r=*p, and the values p, q, r and s are progressively increased, and if *q&&!(s % 2) is judged to be not true, the values r and q are progressively increased; and execute fourth traversing encryption, wherein when the value p points to the bit $x_i$ of the set M, the value q points to the bit $y_j$ of the set P, s=0; if *q&&(s % 2) is judged to be true, *r=*p, and the values p, q, r and s are progressively increased; and if *q&&(s % 2) is judged to be not true, the values r and q are progressively increased.

* * * * *